UNITED STATES PATENT OFFICE.

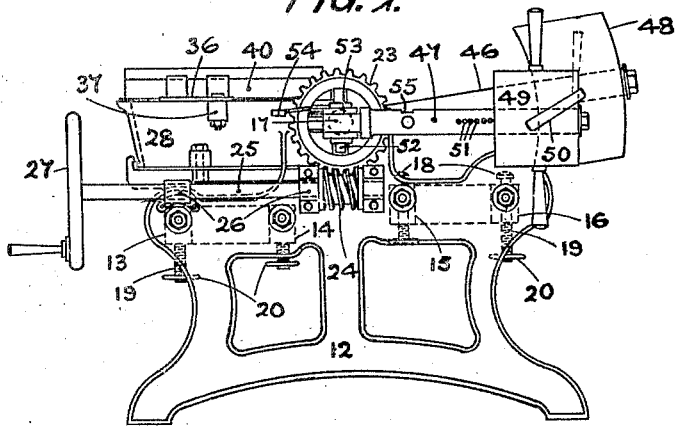
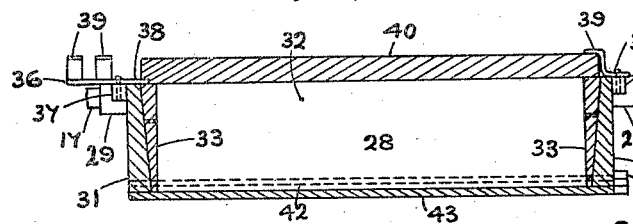 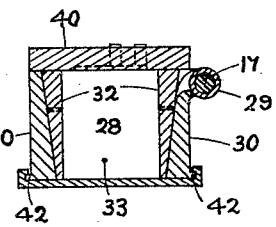
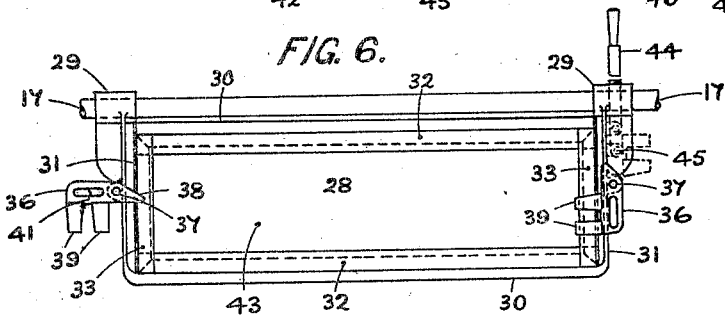
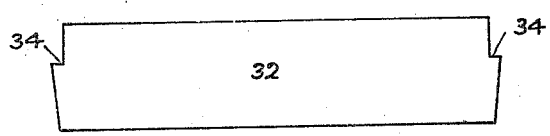 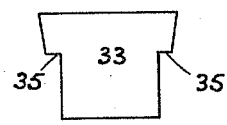

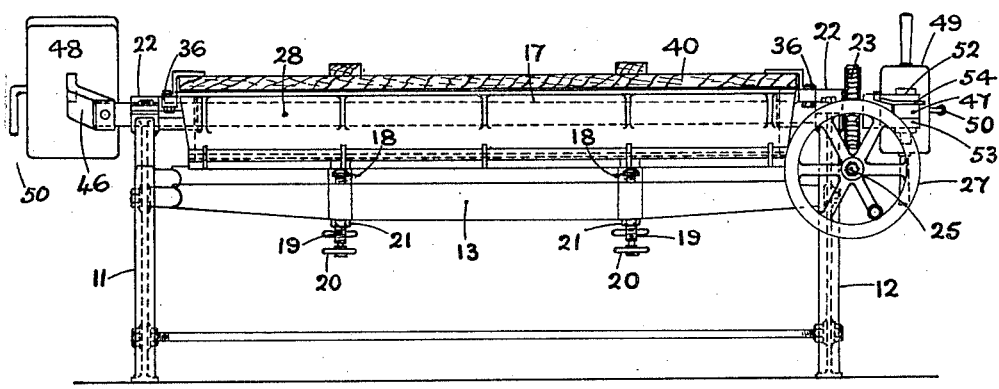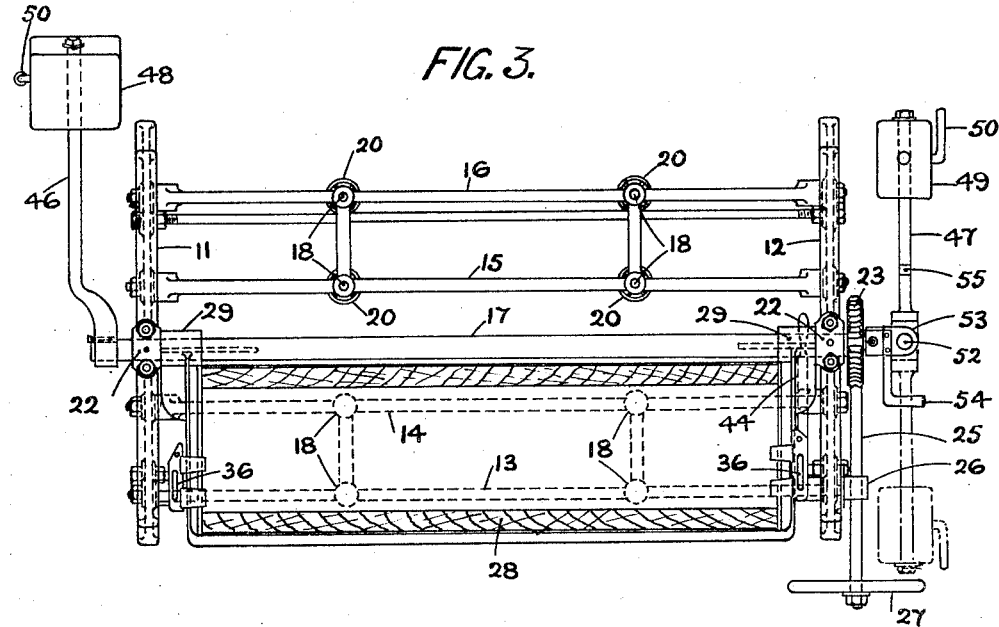

ROBERT HUTCHISON KIRK, OF NEWCASTLE-UPON-TYNE, ENGLAND.

MOLD FOR PLASTIC AND SIMILAR SUBSTANCES.

1,345,932.     Specification of Letters Patent.     Patented July 6, 1920.

Application filed January 24, 1920. Serial No. 353,680.

*To all whom it may concern:*

Be it known that I, ROBERT HUTCHISON KIRK, a subject of the King of Great Britain and Ireland, residing at 4 Stephendale Terrace, St. Peters, in the city and county of Newcastle-upon-Tyne, England, have invented new and useful Improvements in Molds for Plastic and Similar Substances, of which the following is a specification.

This invention relates to molds such as are employed for casting plastic and similar substances, for example concrete blocks, artificial stone, flagstones and other blocks for general building and like purposes, and has particular reference to molds which are inverted to discharge the molded block and which have sloping sides and ends and are provided with loose or detachable tapered linings so that, when the molded block is being discharged, the linings permit of the ready separation of the block from the mold. The object of the present invention is to provide an improved construction.

In a mold in accordance with this invention the bottom of the mold is slidably connected to the sides of the mold, and adapted to be reciprocated. The tapered linings at the sides of the mold are locked in position by the tapered linings at the ends thereof, and the tapered end linings are locked in position by catches pivoted to the mold which also serve to lock the pallet in position during inversion. The mold may be adapted to be inverted by hand, or it may be combined with a machine for inverting it. The preferred construction of machine comprises end frames between which are disposed cross-bars carrying adjustable supports for the mold and the pallet and a central shaft to which the mold is attached and which forms the pivot about which it is turned, said shaft being rotated by worm gearing. The mold is balanced by a pair of weighted arms one of which is adapted to be swung to either side of the central shaft to compensate for the difference in the weight of the mold with and without the molded block.

I will fully describe my invention with reference to the accompanying drawings wherein:—

Figures 1, 2 and 3 are an end view, side elevation and plan respectively of one construction of molding machine embodying my invention; and Figs. 4, 5 and 6 are a longitudinal section, a cross section and a plan respectively of the mold thereof.

Figs. 7 and 8 are elevations of the linings used in the mold.

In Figs. 3 and 6 the pallet is removed for clearness.

Referring to the drawings, the molding machine therein illustrated comprises a pair of end frames 11, 12 between which are disposed crossbars 13, 14, 15 and 16 and a central shaft 17. The crossbars are provided with adjustable supports 18 formed in one with threaded pins 19 passing through threaded holes in the crossbars and having handwheels 20 whereby they can be rotated to adjust them vertically. Lock nuts 21 (Fig. 2) are provided for fixing the supports after adjustment. The shaft 17 is mounted in bearings 22 in the end frames and has fixed to it at one end a worm wheel 23 with which engages a worm 24 on a shaft 25 in bearings 26 on the adjacent end frame. 27 is a handwheel fixed on the shaft 25 whereby the worm 24 can be rotated to rotate the wormwheel 23 and shaft 17.

The mold 28 rests upon the supports 18 at one side of the shaft 17 and is provided with lugs 29 keyed to the shaft 17, and (as shown in Figs. 4 to 8) its sides 30 and ends 31 are sloped on the inside to receive the tapered side linings 32 and tapered end linings 33. The side linings 32 are stepped at the ends at 34 and are held in position in the mold by the end linings 32 which are stepped at 35. Catches 36 pivoted to lugs 37 formed at the ends of the mold are provided for holding the end linings in position. The catches 36 have three positions, viz. that shown in dot-and-dash lines at the right-hand end of Fig. 6, in which position the catch is clear of the end linings to permit of them and the side linings being removed and replaced; that shown at the left-hand end of Fig. 6, in which position the tail-piece 38 secures the end linings and consequently the side linings; and as shown in full lines at the right hand end of Fig. 6, in which position the fingers 39 secure the pallet 40 in position during inversion of the mold. 41 (Fig. 6) is an aperture whereby the catches can be gripped to swing them about their pivots. The sides 30 of the mold are each provided with a ledge 42 (Fig. 5) adapted to engage corresponding grooves in the bottom 43 of the mold to which is attached a lever 44 pivoted to a lug 45 on one end of the mold. By rocking the lever 44 about its pivot the bottom 43 can be reciprocated.

At the ends of the shaft 17 are provided weighted arms 46, 47 the weights 48, 49 of which are adjustable as to their distance from the shaft and can be locked in position by locking screws 50 the ends of which engage recesses 51 (Fig. 1) in the arms. The arm 47 is adapted to be swung about a pin 52 in a fork 53 provided at the end of the shaft 17 so as to apply its weight 49 on either side of the shaft as required. When both weights 48, 49 are on the opposite side of the shaft 17 to the mold they balance the mold when filled with concrete. When the weight 49 is swung over onto the same side of the shaft 17 as the mold then its weight and the weight of the empty mold is balanced by the weight 48. 54 is a spring clip adapted to engage a recess 55 in the arm 47 when it is on the same side of the shaft as the mold to prevent it swinging outward during the return of the mold.

In use, the side and end linings 32, 33 are placed within the mold as shown in Figs. 4, 5 and 6 and locked in position by moving the catches 36 into the position shown at the left of Fig. 6. The mold is then filled with concrete or other plastic substance to be molded and the pallet 40 is placed over the top and secured by moving the catches 36 into the position shown in full lines at the right of Fig. 6. The movable weighted arm 47 having been moved to the opposite side of the shaft 17 to the mold, the handwheel 27 is rotated to revolve the shaft through 180° and invert the mold so that the pallet rests upon the supports 18 at the other side of the shaft. The catches 36 are then turned into the position shown in dot-and-dash lines at the right of Fig. 6 to free the pallet and linings, and the bottom 43 is slid by rocking the lever 44 which relieves the suction between the molded block and the bottom and permits the mold to be lifted. The arm 47 is swung over to the same side of the shaft 17 as the mold (as shown in dotted lines in Fig. 3) to compensate for the weight of the molded block, and the handwheel 27 is rotated in the reverse direction to return the mold to its original position leaving the molded block on the pallet with the linings surrounding it. The linings are removed from the block and replaced in the mold which is then ready to be re-filled with concrete for the next block, the pallet and block being meanwhile removed to some convenient place to dry.

The adjustable supports 18 permit of the vertical adjustment of the mold to suit different conditions or thicknesses of pallets. The weights on the arms 46, 47 are adjustable as to their distance from the shaft 17 to balance the mold when fully or when partly loaded.

When molding artificial stone I prefer to employ rock-faced or other replica plates of aluminium or aluminium alloy which are light in weight, rustless, tough and durable in use.

What I claim and desire to secure by Letters Patent is:—

1. The combination of a mold for casting plastic and similar substances having sloping sides and ends, detachable tapered side linings, detachable tapered end linings which lock said side linings in position, a pallet, pivoted catches which lock both said end linings and said pallet in position, and means for inverting the mold.

2. The combination of a mold for casting plastic and similar substances having sloping sides and ends, a slidable bottom therefor, means for reciprocating said bottom, detachable tapered side linings, detachable tapered end linings which lock said side linings in position, a pallet, pivoted catches which lock both said end linings and said pallet in position, and means for inverting the mold.

3. A molding machine comprising end frames, cross-bars between said end frames, adjustable supports carried thereby, a central shaft between said end frames, a mold thereon having sloping sides and ends, detachable tapered side linings, detachable tapered end linings which lock said side linings in position, a pallet, pivoted catches which lock both said end linings and said pallet in position, worm gearing for rotating said shaft to invert and return said mold, and weighted arms at each end of said shaft for balancing the mold, one of said arms being adapted to be swung to either side of said shaft to compensate for the difference in the weight of the mold when filled and when empty.

In testimony whereof I have signed my name to this specification.

ROBERT HUTCHISON KIRK.